Feb. 21, 1933.　　　　J. N. BAKER　　　　1,898,806
CENTRIFUGAL FLEXIBLE COUPLING
Filed Dec. 19, 1929　　　4 Sheets-Sheet 1
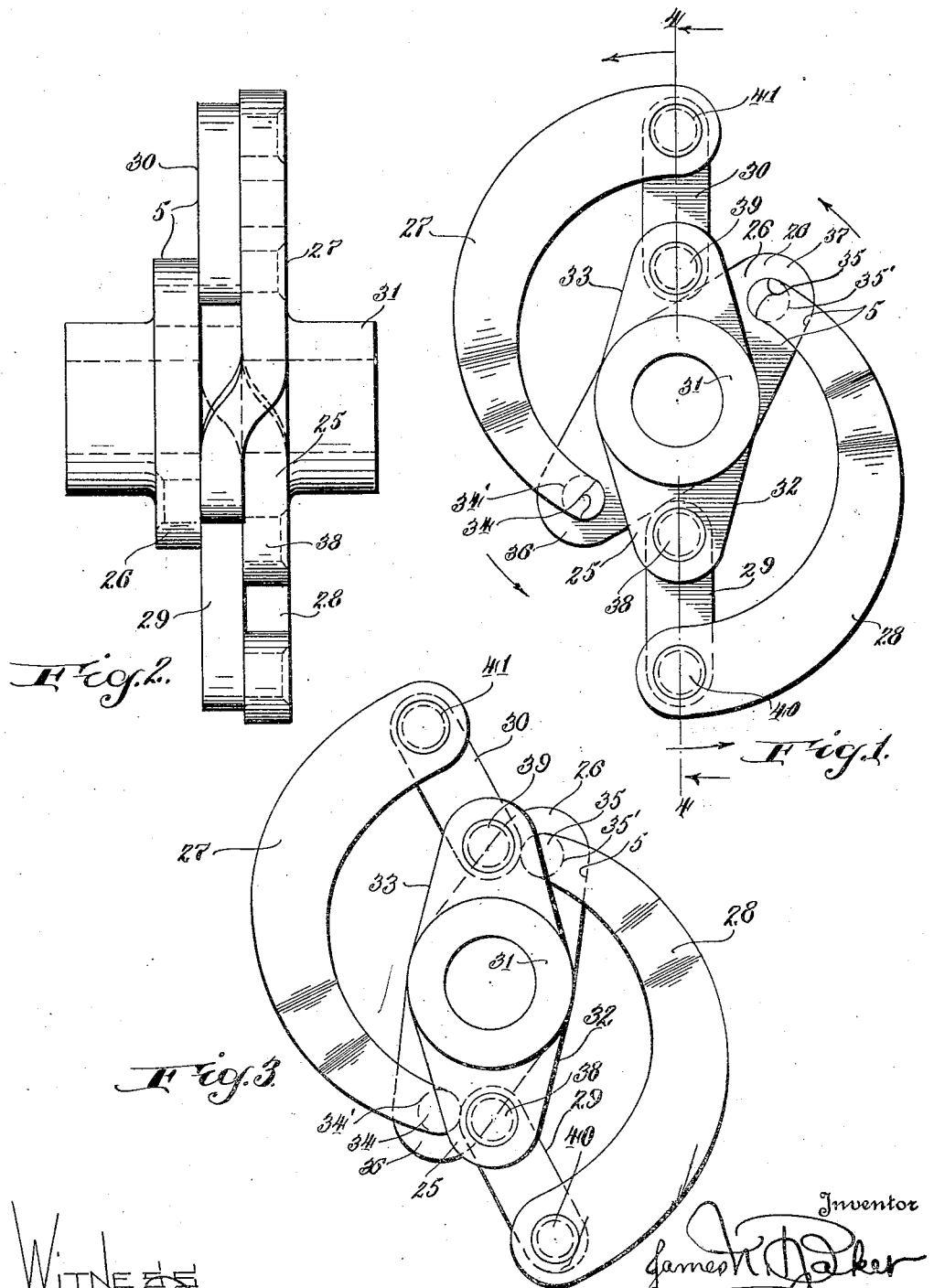

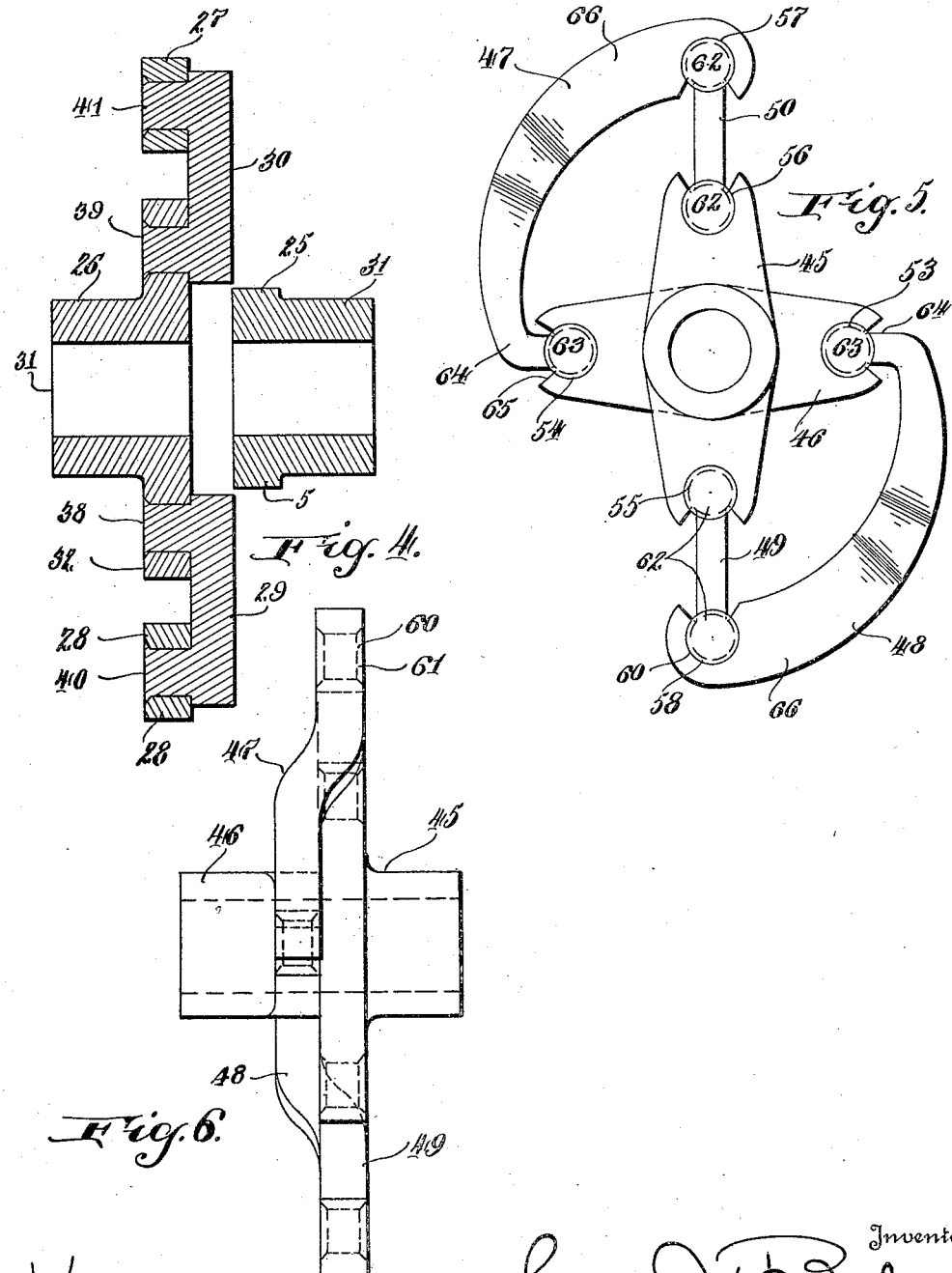

Feb. 21, 1933.        J. N. BAKER        1,898,806
CENTRIFUGAL FLEXIBLE COUPLING
Filed Dec. 19, 1929        4 Sheets-Sheet 3
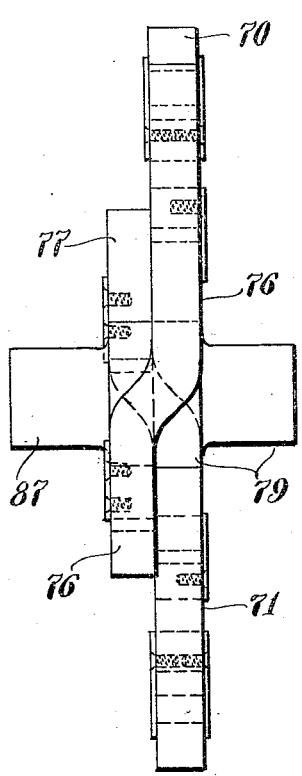
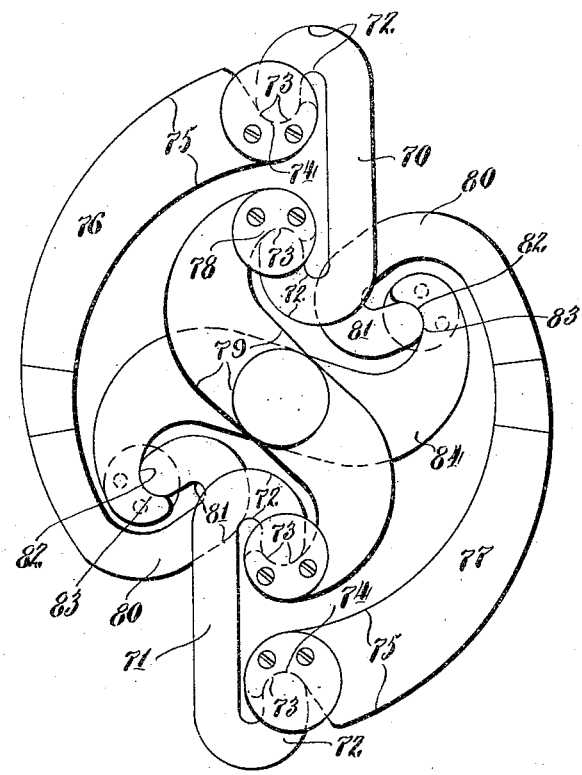
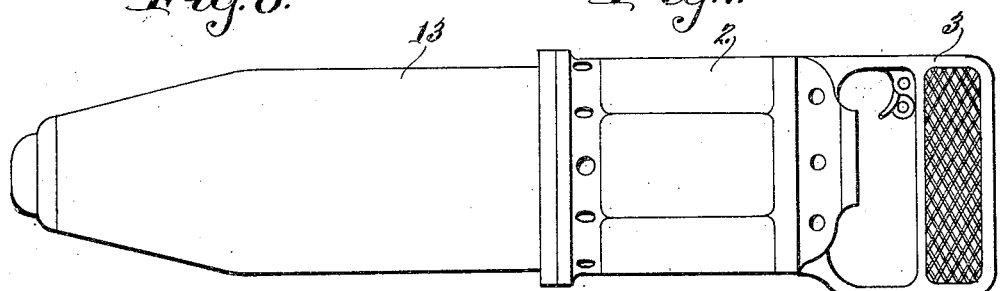

Feb. 21, 1933. J. N. BAKER 1,898,806
CENTRIFUGAL FLEXIBLE COUPLING
Filed Dec. 19, 1929 4 Sheets-Sheet 4
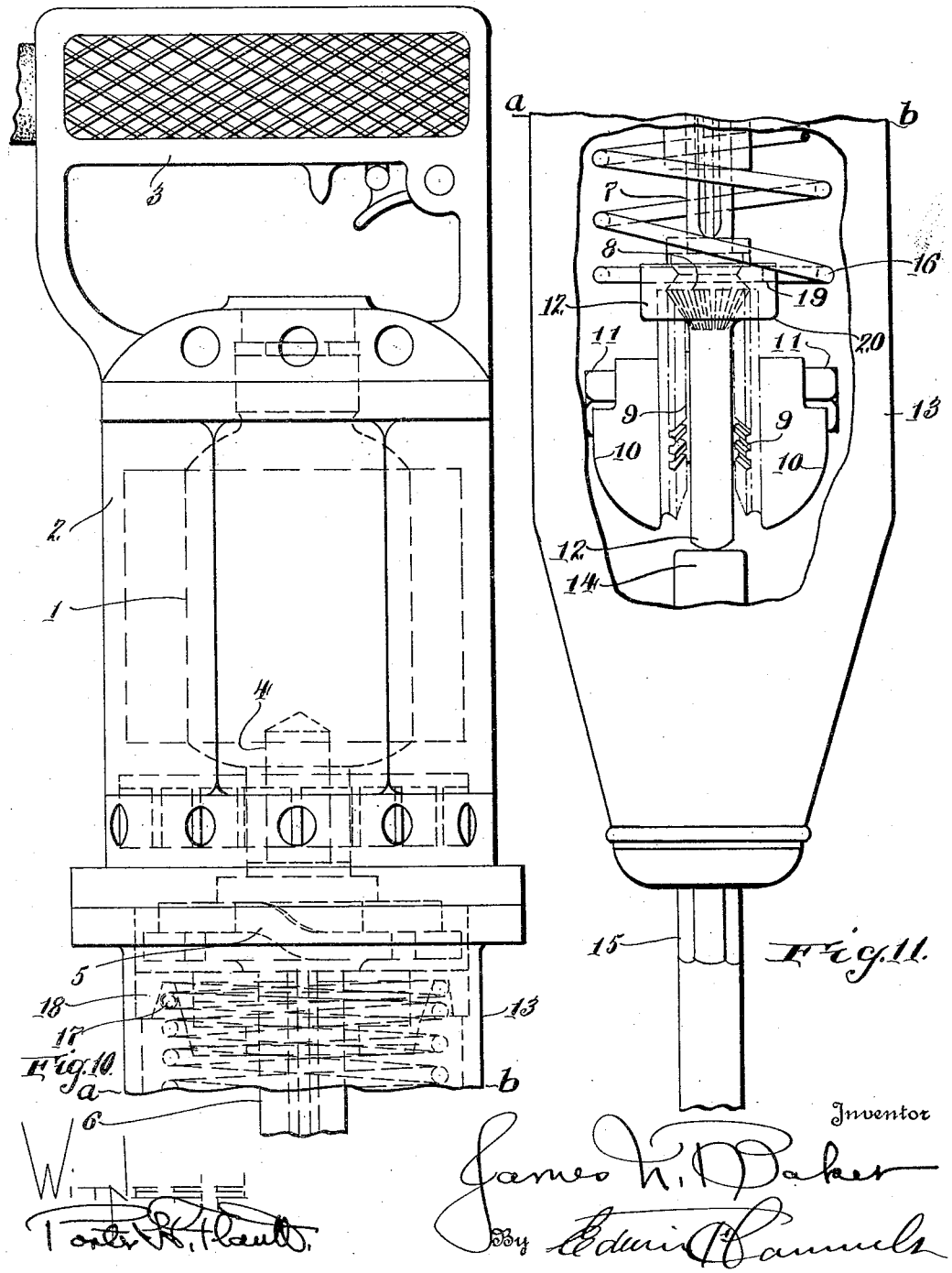

Patented Feb. 21, 1933

1,898,806

UNITED STATES PATENT OFFICE

JAMES N. BAKER, OF TOWSON, MARYLAND, ASSIGNOR TO THE BLACK & DECKER MANUFACTURING COMPANY, OF TOWSON, MARYLAND, A CORPORATION OF MARYLAND

CENTRIFUGAL FLEXIBLE COUPLING

Application filed December 19, 1929. Serial No. 415,153.

The invention relates to a coupling for connecting driving and driven rotary members where it is necessary to compensate for sudden changes in speed and torque. The conditions most frequently encountered requiring such a coupling are those in which the driving source delivers power at a practically constant speed and torque, while the driven mechanism requires power with sudden changes in speed and torque. The coupling, which is the subject of the invention, has a torquewise yielding function and may therefore be termed a flexible coupling, but in the form shown it includes no inherently flexible members as springs, flexible discs, leather or rope loops or the like, which are elements of the majority of flexible couplings. Instead of such inherently flexible members, the coupling includes one or more centrifugal elements, the centrifugal tendencies of which are so applied as to balance the torque demanded by the load.

In the various portable power driven hammers, other power hammers, portable power driven wrenches, screw drivers and the like, such violent changes of load torque and hence of speed occur that shearing of keys, breaking of gear teeth and failure of the mechanical connections in other ways is unavoidable. To defer and reduce such failures of these and other parts is the object of the invention. To this end the yielding centrifugal coupling of the invention has been introduced between the tool or bit and the source or motor.

In the accompanying drawings I have illustrated my flexible coupling in a preferred and other secondary forms, together with so much of a portable power driven hammer as is believed to be essential to a full illustration of the manner of applying and using the invention.

In the drawings:

Figure 1 is a plan view of the coupling looking at the same from the side of the driven member which is to be connected to the load or mechanism to be driven, the parts being in the position representing the no load condition. This may be termed a bottom plan.

Figure 2 is a side elevation looking at the same from the left as seen in Figure 1.

Figure 3 is a plan view corresponding to Figure 1 showing the parts in a different angular position.

Figure 4 is a section on the line 4—4 of Figure 1.

Figure 5 is a plan view corresponding to Figure 1 showing a modified form.

Figure 6 is an elevation looking at the coupling from the left as seen in Figure 5.

Figure 7 is a plan view of the coupling in still another form, the same being in a position and seen from a point of view corresponding to Figure 1.

Figure 8 is an elevation looking at the coupling from the left in Figure 7.

Figure 9 is an external view of a portable hammer to which the coupling is applied.

Figure 10 is an elevation of the motor casing and part of the barrel of a portable hammer, the barrel being broken away on line ab.

Figure 11 is a view corresponding to Figure 10 showing the barrel, both views 10 and 11 being broken away on corresponding lines so that the two views taken together constitute a complete elevation of the hammer on an enlarged scale as compared to Figure 9. A portion of the casing is also removed to show the operating parts within.

The casing is broken away in Figure 11 to expose the mechanism.

Referring to the drawings by numerals, each of which is used to indicate the same or similar parts in the different figures, the electric hammer in connection with which the coupling of the invention is illustrated, comprises a motor 1, enclosed in a motor casing 2 having a grip 3. The motor shaft 4 is connected by means of the flexible coupling 5 to the hollow driven shaft 6 which has a rotating and sliding connection to and with the pinion shaft 7, which carries a bevel pinion 8 meshing with the bevel gears 9, carrying eccentric weights 10 rotating on suitable journals 11 carried by the spider 12 to which vibrations are imparted by the rotation of the centrifugal weights, said vibrations being transmitted to the anvil 14 by which the vibrations are transmitted to the bit 15. The said parts other than the motor are enclosed in a barrel 13.

The spider 12 is restrained from rotation with the shaft 7 by means of a spring 16 which engages a groove 17 in the stationary member 18 and a groove 19 in the head 20 of the spider.

Referring now to Figures 1, 2, and 3, the coupling consists of a driven member 25, adapted to be connected to the load or mechanism to be driven, driving member 26 adapted for connection to the source of power, centrifugal arms 27 and 28, and links 29 and 30. The driven member 25 consists of a hub or boss 31 adapted to be mounted on a driven shaft, and opposite radial arms 32 and 33 project from the hub to the outer ends of which the corresponding inner ends of the links 29 and 30 are pivotally connected.

The centrifugal arms 27 and 28 are shown as of arcuate form and each is formed with a reducing taper toward one end, said small inner ends being indicated by reference characters 34 and 35. These arms are pivotally connected at their small ends to the outer opposite ends of the driving member 26 which, like the driven member 25, is provided with outwardly projecting radial arms 36 and 37 in the outer ends of which the respective pivots formed on the small ends of the centrifugal arms 27 and 28, have their bearings, so that these arms 27 and 28, in the absence of other restraint, are adapted to swing about their small ends relatively to the opposite outer ends of arms 36 and 37, of the member 26. The links 29 and 30 have already been described as pivotally connected at their inner ends at 38 and 39, respectively, to the outer ends of the radial arms 32 and 33 of the driven member 25. The ends of the centrifugal arms 27 and 28 opposite to the respective ends 34 and 35, i. e., the large ends of these arms, are pivotally connected to the outer or swinging ends of the links 29 and 30, respectively, said pivots or pivot points being indicated respectively by reference characters 39 and 40, and the pivot pins at 34 and 35 by reference characters 34' and 35'.

It will be apparent that in operation in no load condition, as illustrated in Figure 1, the driving member 26 being rotated at sufficient speed to overcome the friction of the parts, the centrifugal arms 27 and 28, which may be of any desired weight, as dictated by the speed and forces to be transmitted and equalized, will swing outwardly to outer position, causing the links 29 and 30 to extend outward radially, as illustrated, pivots 38, 39, 40 and 41 lying substantially in a straight diametrical line, which extends through or nearly through the center of rotation of the coupling.

Assuming now, for further illustration, that the rotary tendency of the driving member 26, is in a right handed direction, or left handed, as seen from below in Figures 1 and 3, a load applied to the driven member 25 would have a tendency to retard the rotation of this member in the direction of rotation of the driving member 26. This tendency might be treated as a tendency opposed to the direction of rotation of the member 26, tending to rotate the member 25 in a left handed direction relatively to rotation imparted to the member 26. This would tend to change the position of the links 29 and 30, shown in Figure 1, swinging the link 30 to the left and link 29 to the right relatively to driven member 25 and toward the position shown in Figure 3. This change of relation of the parts composing the centrifugal coupling due to the delaying of the driven member behind the driving member will continue until the tangential component of the centrifugal force exerted by centrifugal arms 27 and 28 balances the torque of the load, when the coupling will have reached an equilibrium. The driven member 25 and the driving member 26 will then again rotate at uniform speeds. Reduction of the torque of the load will result in a return of the parts toward the no load positions shown in Figure 1. The weight of the arms is fixed to give the desired centrifugal force at a predetermined speed.

In Figures 5 and 6, I have illustrated a slightly modified form of the invention. The construction shown in these figures comprises a driven member 45 adapted to be connected to the mechanism being driven, a driving member 46 to be connected to the source of power or driving force, centrifugal arms 47 and 48 and links 49 and 50. This construction differs from that of Figures 1, 2, 3 and 4 only as to the manner of arranging the pivotal connections of the centrifugal arms 47 and 48 to the driving member 46 and of the links 49 and 50 to the centrifugal arms and to the driven member. Instead of the pivot pins shown at 34', 35', 38, 39, 40 and 41, the pivotal connections comprise cylindrically curved sockets 53, 54 at each end of the driving member 46, which is shaped substantially like the corresponding member 26 in the form first described, the axes of these sockets being parallel to the axis of rotation. The driven member is provided with corresponding sockets 55 and 56, at its opposite ends, it being understood that the driven member 45, as shown in Figure 5, is formed at its outer ends with sockets 55, 56, and the centrifugal arms 47 and 48 are formed at their large ends with cylindrical sockets 57 and 58, the axes of the sockets 55, 56, 57, 58 being likewise parallel or substantially parallel to the axis of rotation. As shown the sockets are preferably chamfered at their upper and lower edges at 60, and each corresponding pivoted member, i. e., the links 49 and 50 at each end and each of the arms 47, 48 at one end is formed with a cylindrical knob or ball, as it may be termed, which fits in the corresponding socket, being upset or slightly flanged at 61 at each end, the upset portion or flange being tapered to fit in the chamfer 60 to assist in holding the ball or knob in position in the socket. These balls or knobs are formed integrally with the corresponding members, i. e., the links 49, 50 have balls 62 at each end fitting and rocking in the sockets 55, 56, 57, 58, respectively, and the centrifugal arms 47 and 48 have balls 63 at their reduced ends 64, which balls fit and rock in the sockets 53 and 54, and in view of the fact that these balls 62 are formed on the ends of the links 49 and 50, and the balls 63 are formed on the ends of the centrifugal arms 47, 48, the corresponding sockets 53, 54, 55, 56, 57, 58 are formed with arcuate openings 65 in their cylindrical sides which arcuate openings 65 permit the adjacent portions of the links 49 and 50 and the ends 64 of the arms 47 and 48 to oscillate relatively to the members in which said sockets 62 and 63 are formed. This arrangement permits the parts to be located and to oscillate substantially in the same plane eliminating any tendency of the pivotal members to bind, the only offset being that necessitated by the fact that the driven member 45 underlies the driving member 46, Figure 5 being a bottom plan, so that the reduced ends 64 of the centrifugal arms 47 and 48 are offset upwardly to the extent necessary to bring them into the plane of the driving member 46, the driven member 45, the links 49 and 50 and the large ends 66 of the centrifugal arms 47 and 48 adjacent the links 49 and 50, being adapted to oscillate in and being located substantially in the one and the same plane from which plane the ends 64 of the centrifugal arms are offset upwardly into the plane of the driven member 46 to be connected thereto and in order that they may be free to swing in the operation of the coupling as described.

The construction shown in Figures 7 and 8 differs from that shown in Figures 5 and 6 in that the links 70, 71 are formed at each end with hooks 72 each having a rounded end 73 fitting in correspondingly rounded sockets 74 on the swinging or large ends 75 of the centrifugal arms 76 and 77, the rounded ends 73 of the hooks 72 at the opposite ends of said links 70, 71 engaging correspondingly formed oppositely disposed sockets 78 on the opposite ends of the driven member 79, which is adapted to be connected to the mechanism to be driven. The small ends 80 of the centrifugal arms 76 and 77 are formed with hooks 81, having rounded ends 82 fitting in oppositely disposed sockets 83 on the opposite ends of the driving member 84. The respective rounded members 73 and 82 are adapted to rock in the sockets 74 and 83, giving the same pivotal action as that which results in the operation of the form shown in Figures 5 and 6, and that shown in Figures 1, 2, 3 and 4, respectively, but the form shown in Figures 7 and 8 and that in Figures 5 and 6 are of less extent in the direction of the axis than that shown in Figure 1, the parts in Figures 7 and 8 being in a single plane except for member 84 and the offset which is provided in order that the centrifugal arms may swing freely in the operation of the couplings.

I have thus described specifically and in detail a preferred and two modified forms of the invention in order that the manner of constructing, applying and using the same may be clearly understood, however, the specific terms herein are used descriptively rather than in a limiting sense, the scope of the invention being defined in the claims.

What I claim as new and desire to secure by Letters Patent is:

1. The combination in a centrifugal coupling of a driven member adapted to be connected to the load, a driving member adapted to be connected to the source of power, elongated centrifugal members each pivotally connected at one end to the driving member on opposite sides of the center of rotation, and links shorter than said centrifugal members connecting the opposite ends of the centrifugal members to the driven member at points thereon on opposite sides of the center of rotation.

2. The combination in a centrifugal coupling of a driven member adapted to be connected to the load, a driving member adapted to be connected to the source of power, centrifugal members each pivotally connected at one end to the driving member on opposite sides of the center of rotation, links connecting the opposite ends of the centrifugal members to the driven members at points thereon on opposite sides of the center of rotation, said centrifugal members having a reducing taper toward the end which is connected to the driving member, the larger end serving as a centrifugal weight the centrifugal members being normally arranged with their longitudinal dimensions approaching alignment with a circular arc concentric with the axis of the driving and driven members.

3. The combination in a centrifugal coupling of a driven member adapted to be connected to the load, a driving member adapted to be connected to the source of power, a centrifugal arm, pivotally connected at one end to the driving member at a point spaced outwardly from the center of rotation, a link connecting the opposite end of the centrifugal arm to the driven member at a point thereon spaced outwardly from the center of rotation, said centrifugal arm being of arcuate shape and of reducing taper toward the end which is connected to the driving member, the larger end serving as a centrifugal weight the centrifugal arm being normally located substantially on the line of a circular arc concentric with the axis of the driving and driven members.

4. The combination in a centrifugal coupling of a driven member adapted to be connected to the load, a driving member adapted to be connected to the source of power, sharply curved centrifugal arms each having an end pivotally connected to the driving member at points thereon on opposite sides of the center of rotation, said centrifugal arms being offset in the direction of the axis of rotation to permit them to swing freely relatively to said driving and driven members, links connecting the other ends of said centrifugal members to said driven member, the path of swing being controlled by said links the centrifugal arms in the operation of the coupling approaching and receding from a position in which they are substantially in alignment with circular arcs concentric with the axes of the driving and driven members.

5. The combination in a centrifugal coupling of a driving member adapted to be connected to a source of power, a driven member adapted to be connected to the load, centrifugal arcuately curved arms pivotally connected to one of said members at points spaced outwardly on opposite sides of the center of rotation, and links connecting the opposite ends of said arms to the other said member at points spaced from the center on opposite sides, said arms being tapered and of increasing section toward the points of connection to said links the centrifugal arms in the operation of the coupling approaching and receding from a position in which they are substantially in alignment with circular arcs concentric with the axes of the driving and driven members.

6. The combination in a centrifugal coupling of a driving member adapted to be connected to a source of power, a driven member adapted to be connected to the load, centrifugal arcuately curved arms pivotally connected to one of said members at points spaced outwardly on opposite sides of the center of rotation, and links connecting the opposite ends of said arms to the other said member at points spaced from the center on opposite sides, said arms being tapered and of increasing section toward the points of connection to said links, said arms being offset in the direction of the axis of rotation to bring their centers of gravity substantially into a single transverse plane of oscillation to enable them to swing freely by avoiding lateral torque and the consequent tendency to bind.

7. The combination in a centrifugal coupling of a rotating driving member, of considerable radial extent adapted to be connected to a source of power, a rotating driven member likewise of considerable radial extent adapted to be connected to the load, centrifugal arms pivotally connected to one of said members at points spaced outwardly on opposite sides of the center of rotation and swinging means connecting the opposite ends of said arms to the other said member at points spaced outward from the center on opposite sides, said arms being heavier adjacent said swinging means than at the other end, the centrifugal arms being normally arranged in the operation of the clutch substantially in alignment with corresponding circular arcs concentric with the axes of the driving and driven members.

8. The combination in a centrifugal coupling of a rotating driving member of considerable radial extent adapted to be connected to a source of power, a rotating driven member likewise of considerable radial extent adapted to be connected to the load, centrifugal arms pivotally connected to one of said members at points spaced outwardly on opposite sides of the center of rotation, and swinging means connecting the opposite ends of said arms to the other said member at points spaced outward from the center on opposite sides, said arms being offset and thereby arranged to oscillate substantially in the same plane of rotation transverse to the axis to avoid lateral torque and consequent tendency to bind the centrifugal arms being normally arranged in the operation of the clutch substantially in alignment with corresponding circular arcs concentric with the axes of the driving and driven members.

9. The combination in a centrifugal coupling of a rotary driving member of considerable radial extent adapted to be connected to a source of power, a rotary driven member likewise of considerable radial extent, adapted to be connected to the load, centrifugal arcuately curved arms pivotally connected to the driving member, links connecting the opposite ends of said arms to the driven member, the ends of said arms adjacent the driving member being heavier than the ends adjacent the links, and said arms being arranged with their centers of gravity substantially in a single plane of rotation transverse to the axis to avoid lateral torque and consequent tendency to bind the centrifugal arms being normally arranged in the operation of the clutch substantially in alignment with corresponding circular arcs concentric with the axes of the driving and driven members.

10. The combination in a centrifugal coupling of a driving member adapted to be connected to the power, and a driving member adapted to be connected to the load, the members having flexible connecting means to allow the members temporary displacement, said means comprising centrifugal tapered members, the smaller end being pivotally connected to one of the driving members on opposite sides of the center of rotation, links connecting the larger end of the centrifugal members at points thereon on opposite sides of the center of rotation, the connecting links being of relatively shorter length than the centrifugal tapered members whereby the movement of said centrifugal members about their pivoted end will be limited to the length of the connecting links.

Signed by me at Towson, Baltimore County, Maryland, this 29th day of November, 1929.

JAMES N. BAKER.